March 20, 1956 C. M. GARNER ET AL 2,739,204
SPACE THERMOSTAT
Filed May 26, 1954
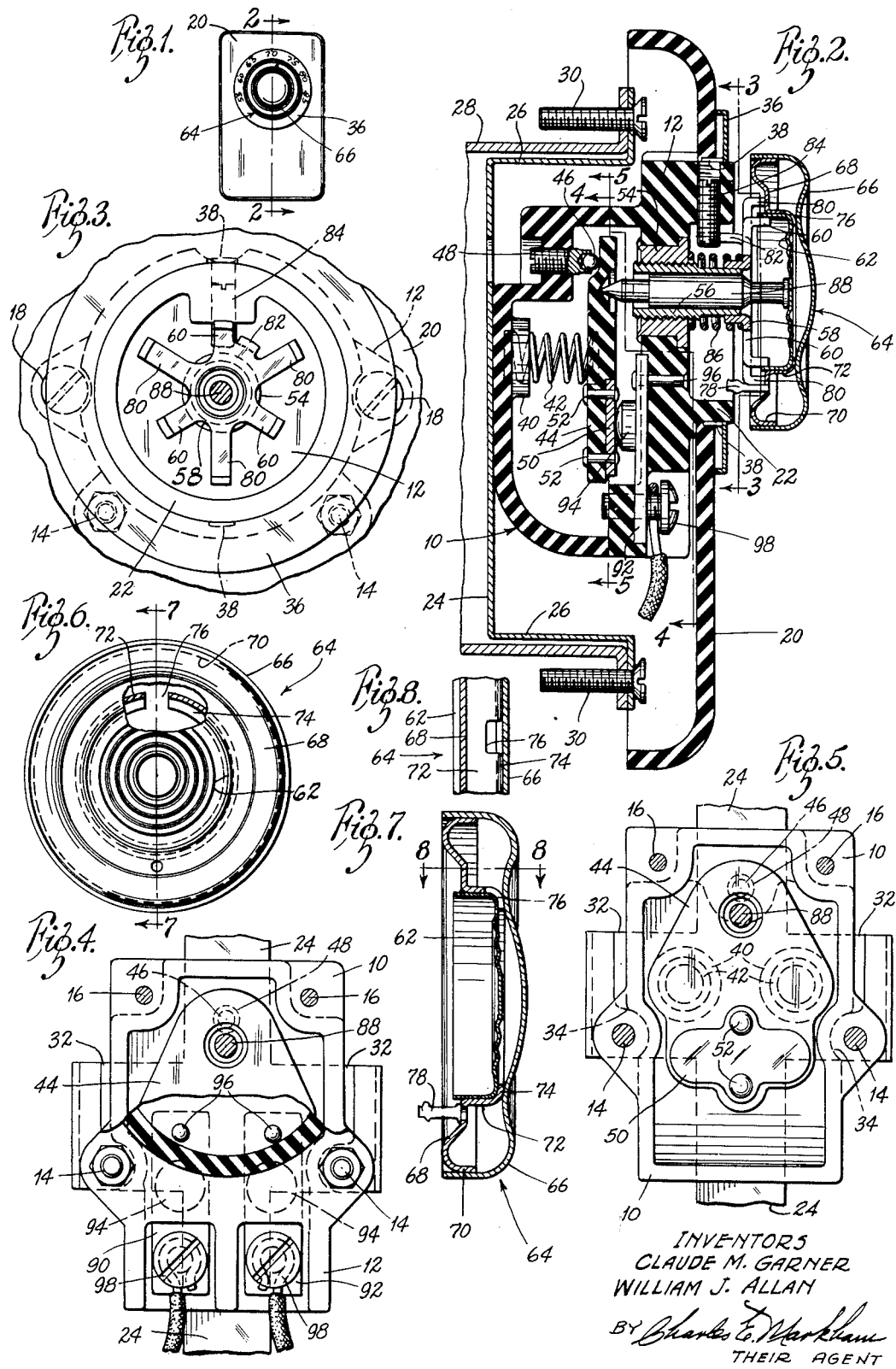
INVENTORS
CLAUDE M. GARNER
WILLIAM J. ALLAN
BY Charles E. Markham
THEIR AGENT

United States Patent Office 2,739,204
Patented Mar. 20, 1956

2,739,204

SPACE THERMOSTAT

Claude M. Garner, Clayton, and William J. Allan, Webster Groves, Mo., assignors to Missouri Automatic Control Corporation, St. Louis, Mo., a corporation of Missouri Application May 26, 1954, Serial No. 432,346

9 Claims. (Cl. 200—140)

This invention relates to a space thermostat which is particularly sensitive to radiant heat.

Heretofore, space thermostats for controlling the temperature of heated living space have been constructed so that the temperature sensitive element, usually a bimetallic strip or coil, is enclosed in a ventilated casing which permits heat transfer between the element and the ambient air mass by convection or circulation, but effectively shields the element from heat absorption by direct radiation from the heat producer or radiator. The purpose of enclosing the element in this manner is not to shield it from direct radiant heat, but rather to protect it and enclose it, together with its associated switch structure, so as to present an instrument more pleasing to the eye.

However, in radiant heating systems in which the living space is heated by radiant walls or panels, it is essential to human body comfort that the sensitive element of the control thermostat be exposed so as to effectively sense radiant heat as well as the temperature of the ambient air mass. It will be readily appreciated that the human body may be uncomfortably warm when receiving too much heat by direct radiation even though the temperature of the ambient air mass is somewhat below that for human body comfort.

Accordingly, an object of this invention is to provide a generally new and improved space thermostat having a temperature sensitive element which is constructed and arranged so as to be particularly sensitive to radiant heat.

A further object is to provide a space thermostat having a temperature sensitive element of sufficiently rugged construction to permit its being arranged in an exposed position in which it receives heat from the radiator by direct radiation.

A further object is to provide a space thermostat in which the temperature sensitive element is adjustable with relation to the switch structure which it actuates and in which the temperature sensitive element itself is formed as a convenient manual adjusting handle.

A further object is to provide a thermally expanding, fluid-type space thermostat having a temperature sensitive element in the form of a fluid filled expanding receptacle which is adjustable with relation to the switch structure which it actuates and in which the expanding receptacle has the form of a relatively large diameter disc which serves as a convenient manual adjusting knob.

These and other objects and advantages will become apparent from the following description when read in connection with the accompanying drawing, in which;

Fig. 1 is a front elevation of a space thermostat constructed in accordance with the present invention;

Fig. 2 is a vertical sectional view taken on line 2—2 of Fig. 1;

Fig. 3 is a fragmentary sectional view taken on line 3—3 of Fig. 2;

Fig. 4 is a fragmentary view taken on line 4—4 of Fig. 2;

Fig. 5 is a fragmentary view taken on line 5—5 of Fig. 2;

Fig. 6 is a rear view of the fluid filled temperature sensitive element which jointly serves as a manual adjustment knob;

Fig. 7 is a sectional view of the element adjusting knob taken on line 7—7 of Fig. 6; and Fig. 8 is a fragmentary sectional view of the element adjustment knob and is taken on line 8—8 of Fig. 7.

Referring to the drawing in more detail, a hollow body member is indicated at 10 having a cover member 12 attached thereto by bolts 14 and 16. Attached to the cover member 12 by means of screws 18 is a face plate 20. The face plate has a perforation therein which fits over a short cylindrical projection 22 formed as part of the cover member. The body member 10, cover 12, and face plate 20 are preferably constructed of molded dielectric material such as a filled thermo-setting plastic. They may, however, be constructed of metal with the provision of suitable electrical insulators.

Attached to the body member 10 is a formed metal mounting strap 24 having right anguarly formed end legs 26 which are perforated for attachment to an electrical outlet box, shown in part at 28, by screws 30. The strap 24 has intermediate laterally extending legs 32 which are right angularly formed and which have perforated ear portions 34 at their ends which receive the body and cover attaching bolts 14. Fitted over the projecting end of the cylindrical cover extension 22 is a formed metal ring 36 on the face of which is etched in uniform progression a temperature range in degrees Fahrenheit. This indicia ring is snugly fitted over the extension 22 and is provided with inwardly extending tangs 38 which enter notches in the side walls defining the perforation in face plate 20. The tangs 38 are formed inwardly at an angle of slightly less than 90° so as to be sprung slightly when entered into the notches whereby the ring is frictionally held against the face plate as well as being prevented from turning.

The interior of the body member 10 is provided with two recessed bosses 40 which receive one end of a pair of coil springs 42. The springs 42 are received at their other ends in recesses in the inner side of a movable switch contact arm 44, which arm is also preferably constructed of a dielectric thermo-setting plastic material. The springs 42 engage the arm at an intermediate point of its length and constantly urge it outwardly. At one end arm 44 bears on its inner side against a pivot ball 46 which is mounted for adjustment in the end of a screw threaded plug 48. At its opposite free end, the contact arm carries on its outer side a transverse contact bar 50 attached thereto by rivets 52. The cover member 12 carries a metal insert plug 54 having a threaded bore therethrough which receives a hollow adjustment screw 56. The outer end of screw 56 has a reduced smooth portion over which is fitted the perforated hub portion of a spider 58. The spider is securely attached to the end of screw 56 as by welding. The spider has three relatively short legs 60 which are right angularly formed at their ends and lie against and are securely welded to the inner side of the inwardly extending side wall of a flexible cup-shaped thin metal diaphragm member 62. The bottom wall of the cup-shaped diaphragm is preferably corrugated in bulls-eye fashion to increase the permissible movement of its center portion. Fitted over the outer portion of the cup-shaped diaphragm is a hollow disc-like member generally indicated at 64, which jointly serves as a manual adjustment knob and as a receptacle for a thermally expanding fluid.

The member 64 consists of an outer cup-shaped metal stamping 66 and an inner ring-like metal stamping 68.

The inner stamping member is provided with a right angularly formed peripheral flange 70 which lies in face to face contact with the inner side wall of the outer cup-shaped member 66 and is continuously welded thereto to form a fluid pressure tight seal. The inner ring stamping is further provided with a right angularly formed internal flange 72 which forms the side wall of a recess into which is fitted the cup-shaped flexible diaphragm member 62, and the side walls of the diaphragm member are continuously welded to flange 72 so as to form a fluid pressure tight seal. The stampings 66 and 68 are formed of considerably thicker stock than the diaphragm member 62 and the walls are therefore considerably more rigid.

The internal flange 72 of the inner ring stamping is further formed at its free edge at 74 and is securely attached to the inner surface of the bottom wall of the outer cup-shaped stamping 66 at this point by welding. The entire space consisting of the annular space between the inner and outer stampings 68 and 66 and between the bottom wall of the diaphragm 62 and the outer stamping is completely filled with a thermally expanding liquid which remains in a completely liquid stage within the range of operation of the device and which preferably is xylene. A notch 76 is cut in the periphery of flange 72 so as to permit communication between the annular and central liquid filled spaces. The device is filled with liquid by first evacuating the air and then entering the liquid through a short piece of capillary tubing 78 which enters a perforation in the inner stamping 68. After filling the end of the capillary tubing is pinched and soldered.

The spider 54 is further provided with three relatively long legs 80 which are right angularly formed outwardly and bear at their ends against the inner face of member 64, thereby to provide additional support means for the adjustment knob 64. The spider 54 is also provided with a leg 82 which is right angularly formed inwardly and which cooperates with a stop screw 84 to limit rotation of the assembly. A spring 86 between the spider and the insert plug 54 provides friction between the screw threads of the adjustment screw 56 and plug 54 so as to maintain the assembly in any adjusted position.

Slidably fitted in the hollow adjustment screw 56 is an actuating rod 88 having an inner conically pointed end which bears in a conical recess in the outer surface of contact arm 44 and at a point on the contact arm lying between the pivot ball 46 and the springs 42. The outer end of rod 88 is flat and bears against the center of the flexible diaphragm wall 62. Cover plate 12 is provided with a pair of laterally spaced conductor plates 90 and 92, each of which carry a contact 94. The contacts 94 are bridged by the contact bar 50 carried by the free end of the contact arm 44 when it swings outwardly. The conductor plates 90 and 92 are connected to the cover 12 by rivets 96 at one end and at their other ends by lead attaching screws 98.

In operation, when the liquid in the hollow adjustment knob 64 expands due to the increase in space temperature, the diaphragm 62 flexes and moves the rod 88 inwardly causing the contact arm 44 to rotate clockwise about the pivot ball 46, thereby separating the contact bar 50 from the contacts 94 and breaking an energizing circuit for a heat producing device at that point. As the temperature of the space subsequently drops due to heat loss, the liquid will contract thereby permitting the diaphragm to be depressed by rod 88 under the force of springs 42, whereby contact arm 44 is rotated counterclockwise about the pivot ball until the circuit is again closed to energize the heat producer. If it is desired to vary the temperature at which the switch opens or closes, the knob 64 is rotated, thereby moving the screw 56 inward or outward so as to change the relationship between diaphragm 62 and the switch contact arm 44 and thereby requiring more or less expansion or contraction of the liquid therein to actuate the switch.

It will be seen from the foregoing that we have provided a space thermostat of particularly simple construction having a temperature sensitive element mounted in an exposed position on the face of the instrument so as to be sensitive to heat radiating from radiators within the space. It will also be seen that the temperature sensitive element is of such construction as to be relatively rugged and not susceptible to misalignment or damage when mounted in an exposed position which would prevent its proper functioning and that the dual purpose temperature sensitive element 64 is adaptable to configurations which do not detract from the appearance of the instrument when mounted in an exposed position.

The foregoing description is intended to be illustrative and not limiting, the scope of the invention being set forth in the appended claims.

I claim:

1. In a space thermostat, a casing, switch structure enclosed in said casing, a temperature sensitive element disposed exteriorly of and adjacent one wall of said casing, said temperature sensitive element being adjustably mounted in said wall of said casing for adjustment relative to said enclosed switch structure which it actuates, and a member extending through said wall of said casing and operatively connecting said temperature sensitive element and said switch structure.

2. In a space thermostat, a casing, switch structure enclosed in said casing, a hollow guide member threadedly mounted in one wall of said casing for adjustment with relation to said switch structure and extending through said casing wall, a temperature sensitive element mounted exteriorly of said casing on the exterior end of said guide member, and a member extending through said hollow guide member and operatively connecting said temperature sensitive element and said switch structure.

3. In a space thermostat, a casing, switch structure enclosed in said casing including a pivoted switch arm biased in one direction, a tubular guide member extending through one wall of said casing and being threadedly engaged in said casing wall for longitudinal adjustment, a temperature sensitive element mounted exteriorly of said casing on the exterior end of said guide member, said temperature sensitive element comprising an expansible chamber having a movable wall transverse to and adjacent the exterior end of said guide member, and a rod extending through said hollow guide member and being biased longitudinally between said switch arm and said movable wall.

4. In a space thermostat, a casing, switch structure enclosed in said casing including an operating arm, a hollow tubular guide member extending through one wall of said casing and being threadedly engaged therein for adjustment relative to said switch arm, a hollow disc-shaped adjustment knob attached to the exterior end of said guide member, said hollow adjustment knob containing sealed therein a thermally expansible liquid and said hollow adjustment knob having a flexible wall portion concentric with and adjacent the exterior end of said guide member, and a rod extending through said guide member and operatively connecting said switch arm and said flexible wall portion.

5. A temperature sensitive control actuator comprising a hollow disc-like adjustment knob, said knob containing a thermally expanding fluid and being constructed in greater part with relatively thick, rigid walls but having at least a central portion of one side wall thereof constructed of relatively thin flexible material which flexes with expansion and contraction of the fluid contained therein, a hollow externally threaded mounting stud arranged concentrically with said knob with one end thereof adjacent said flexible wall portion and extending perpendicularly therefrom, bracket means for rigidly connecting said adjacent end of said stud with the adjacent peripheral rigid portion of said knob, and an elongated motion transmission member slidably received in said hollow stud and having one end bearing against the center of said flexible wall.

6. In a temperature responsive switching device, a casing, switch structure mounted within said casing, a member exterior of said casing having a portion thereof which moves in response to temperature changes, and a rigid handle portion, an externally screw-threaded portion carried by said handle portion threadedly received in a wall of said casing, and a switch operating rod extending internally and externally through an opening in said casing wall and being operatively connected externally to said responsive portion of said member and operatively connected internally to said switch structure.

7. In a space thermostat, a casing, switch structure supported by and enclosed in said casing, a thermally expansible, fluid-type, temperature responsive switch actuator including a sealed receptacle containing a thermally expansible fluid, and an expansible chamber movable with said receptacle, said receptacle having a screw threaded member thereon and said receptacle being exteriorly mounted for screw threaded adjustment on a wall of said casing, and an operating member extending through the wall of said casing and operatively connecting said expansible chamber and said switch structure.

8. In a space thermostat, a casing, switch structure supported by and enclosed in said casing, a thermally expansible, fluid-type, temperature responsive switch actuator comprising a sealed receptacle containing a thermally expansible fluid, and an expansible chamber in communication with and movable with said receptacle, a threaded aperture in a wall of said casing, said receptacle having the form of a hand knob with a hollow threaded member connected to and extending from one side thereof and said receptacle being exteriorly mounted for screw threaded adjustment in a wall of said casing, and means forming an operative connection between said expansible chamber and said switch structure.

9. A wall thermostat for controlling space temperature comprising a casing, switch structure enclosed in said casing and including a switch operating member extending exteriorly of said casing through an opening in one wall thereof, a hollow adjustment knob containing a thermally expansible fluid, said adjustment knob being adjustably mounted exteriorly of said casing on a wall of said casing, said adjustment knob having a flexible wall portion which flexes with expansion and contraction of the fluid therein, and said flexible wall portion being operatively connected with the exteriorly projecting portion of said operating member.

References Cited in the file of this patent

UNITED STATES PATENTS

| | | |
|---|---|---|
| 2,493,190 | Fuchs | Jan. 3, 1950 |
| 2,586,992 | Rapuano | Feb. 26, 1952 |
| 2,682,590 | Roberson | June 29, 1954 |